(12) United States Patent
Iwasawa

(10) Patent No.: US 10,936,259 B2
(45) Date of Patent: Mar. 2, 2021

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventor: Masayuki Iwasawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/541,171

(22) Filed: Aug. 15, 2019

(65) Prior Publication Data

US 2020/0264817 A1  Aug. 20, 2020

(30) Foreign Application Priority Data

Feb. 14, 2019  (JP) .............................. JP2019-024643

(51) Int. Cl.
*H04N 1/00* (2006.01)
*G06F 3/12* (2006.01)
*G06F 3/0482* (2013.01)

(52) U.S. Cl.
CPC .......... *G06F 3/1231* (2013.01); *G06F 3/0482* (2013.01); *G06F 3/123* (2013.01); *G06F 3/1204* (2013.01)

(58) Field of Classification Search
CPC ...... G06F 3/1231; G06F 3/1204; G06F 3/123; G06F 3/0482
USPC ....................................................... 358/1.15
See application file for complete search history.

(56) References Cited

U.S. PATENT DOCUMENTS

2016/0147980 A1* 5/2016 Yasui .................... G06F 21/105
                                                                    726/26
2019/0306328 A1* 10/2019 Kodama ............ H04N 1/00063

FOREIGN PATENT DOCUMENTS

| JP | 2002183434  | 6/2002 |
| JP | 2002259085  | 9/2002 |
| JP | 2016-173771 | 9/2016 |

* cited by examiner

*Primary Examiner* — Saeid Ebrahimi Dehkordy
(74) *Attorney, Agent, or Firm* — JCIPRNET

(57) ABSTRACT

An information processing apparatus includes a first obtaining unit that obtains update data for a common control program capable of controlling plural apparatuses whose models are different from one another and a model information file including maintenance information indicating a current maintenance state of each of the plural apparatuses, a second obtaining unit that, when updating the common control program using the update data obtained by the first obtaining unit, obtains information regarding a model name from a connected apparatus to be controlled, and a display control unit that, if the maintenance information regarding the connected apparatus from which the second obtaining unit has obtained the information regarding the model name indicates that a maintenance period has expired, displays a selection screen for asking a user whether to delete the model name from a model list displayed to the user by the common control program.

13 Claims, 11 Drawing Sheets

FIG. 5

PRINTER MAINTENANCE EXPIRATION

MAINTENANCE PERIOD OF PR-4700 PRINTER CONNECTED TO TERMINAL APPARATUS HAS EXPIRED.

DELETE MODEL NAME FROM MODEL LIST?

YES  NO

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-024643 filed Feb. 14, 2019.

BACKGROUND

(i) Technical Field

The present disclosure relates to an information processing apparatus and a non-transitory computer readable medium.

(ii) Related Art

In Japanese Unexamined Patent Application Publication No. 2002-183434, a method for supporting remote maintenance is disclosed. The method includes operating, by a user or a manager of a computer system, a certain maintenance key switch provided for the computer system if an apparatus included in the computer system needs to be maintained, accessing, through a network using the computer system as a result of the operation performed on the maintenance key switch, a maintenance information provision server that stores electronic maintenance support information in a database and automatically transmitting information for identifying the apparatus and state information to the maintenance information provision server through the network, searching, using the maintenance information provision server on the basis of the information transmitted from the computer system, the database for maintenance support information regarding the apparatus and transmitting the found maintenance support information to the computer system through the network, and receiving, using the computer system, the maintenance support information transmitted from the maintenance information provision server and outputting a cause of a failure of the apparatus and a maintenance method to an output apparatus.

In Japanese Unexamined Patent Application Publication No. 2016-173771, a program is disclosed. The program causes an information processing apparatus that instructs a device to perform processing to function, when device information is obtained from the device after upgrading of the program starts, as an information obtaining unit that stores, as communication record information, whether the device information has been obtained, an information storage unit that stores the device information obtained by the information obtaining unit in a storage unit, and an information reflection unit that, after the upgrading ends, causes the storage unit to reflect setting information in which a function of the device is set. The information reflection unit determines, when causing the storage unit to reflect the setting information, whether to cause the storage unit to reflect the setting information in the device information stored in the storage unit in accordance with content of the communication record information.

In Japanese Unexamined Patent Application Publication No. 2002-259085, a printer system constructed by connecting at least one printer and a host computer with each other with a bidirectional interface or a network is disclosed. The host computer obtains a core module that serves as a core of a printer driver divided into a plurality of modules by performing bidirectional communication with the printer connected to a port thereof, forms, from the obtained core module, a necessary module by obtaining a model-dependent module from the printer connected to the port thereof, and operates as a driver compatible with the printer connected to the port thereof.

SUMMARY

Aspects of non-limiting embodiments of the present disclosure relate to an information processing apparatus and a non-transitory computer readable medium capable of enabling a user to determine whether to keep using, for an apparatus whose maintenance period has expired, a common control program capable of controlling a plurality of apparatuses whose models are different from one another.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a first obtaining unit that obtains update data for a common control program capable of controlling a plurality of apparatuses whose models are different from one another and a model information file including maintenance information indicating a current maintenance state of each of the plurality of apparatuses, a second obtaining unit that, when updating the common control program using the update data obtained by the first obtaining unit, obtains information regarding a model name from a connected apparatus to be controlled, and a display control unit that, if the maintenance information regarding the connected apparatus from which the second obtaining unit has obtained the information regarding the model name indicates that a maintenance period has expired, displays a selection screen for asking a user whether to delete the model name from a model list displayed to the user by the common control program.

BRIEF DESCRIPTION OF THE DRAWINGS

An exemplary embodiment of the present disclosure will be described in detail based on the following figures, wherein:

FIG. 5 is a diagram illustrating an example of a display screen of a display unit of the terminal apparatus according to the exemplary embodiment of the present disclosure;

DETAILED DESCRIPTION

Next, an exemplary embodiment of the present disclosure will be described in detail with reference to the drawings.

Figure 1:
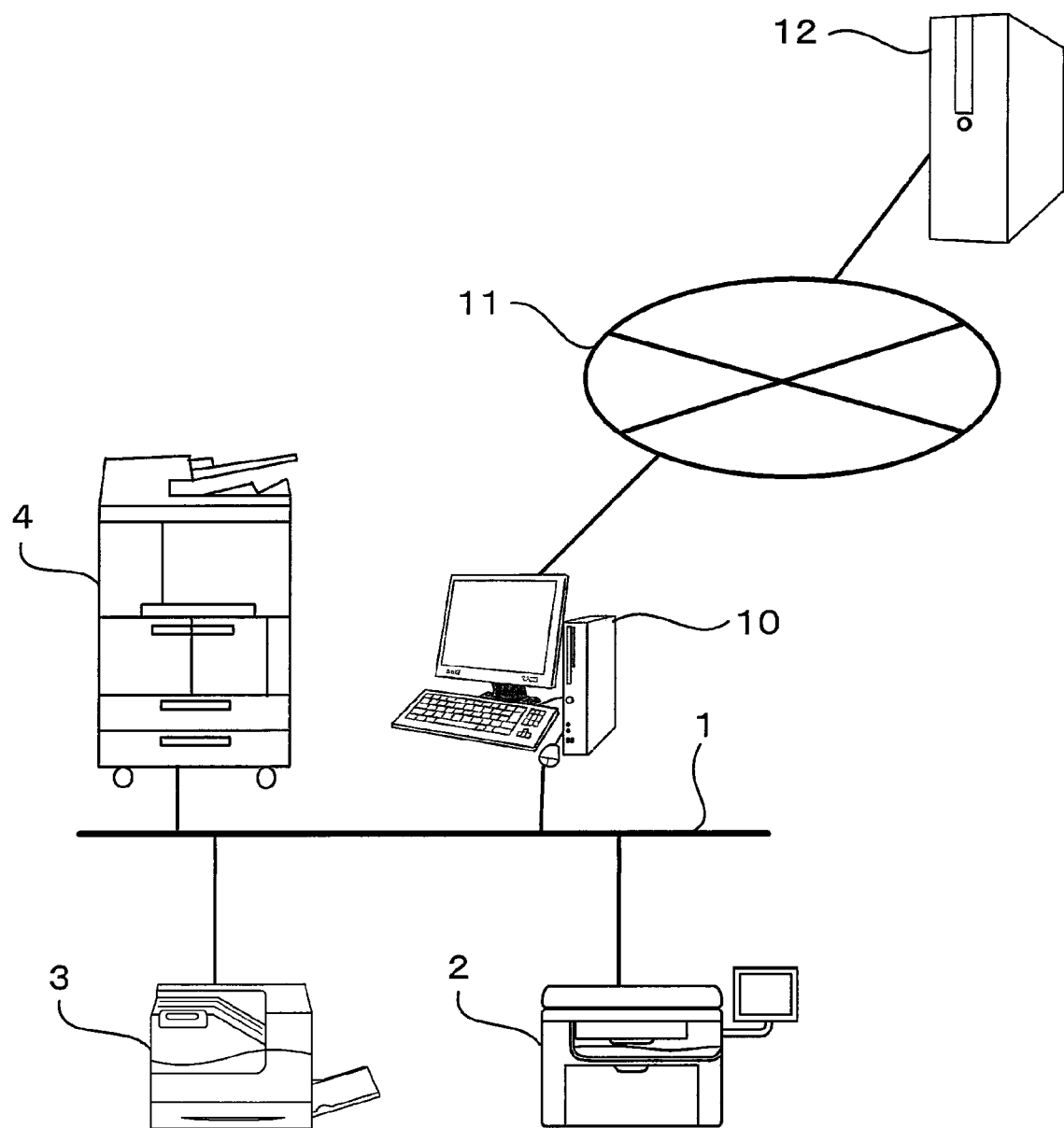
FIG. 1 is a system diagram illustrating the configuration of an information processing system according to an exemplary embodiment of the present disclosure.

FIG. 1 is a diagram illustrating the configuration of an information processing system according to the exemplary embodiment of the present disclosure.

As illustrated in FIG. 1, the information processing system according to the exemplary embodiment of the present disclosure includes a terminal apparatus 10 that serves as an information processing apparatus, such as a personal computer, printers 2, 3, and 4 that serve as image forming apparatuses, such as multifunction peripherals (MFPs), and a server 12.

The terminal apparatus 10 and the server 12 are connected to each other by the Internet 11 and communicate information with each other.

The terminal apparatus 10 and the printers 2, 3, and 4 are connected to each other by a local area network (LAN) 1 and communicate information with each other.

The terminal apparatus 10 generates a print job and transmits the generated print job to the printer 2, 3, or 4 through the LAN 1. The printer 2, 3, or 4 that has received the print job from the terminal apparatus 10 outputs an image based on the print job.

The printers 2, 3, and 4 connected to the LAN 1 are so-called "multivendor apparatuses" whose models are different from one another and that have been manufactured by different manufacturers.

A common driver capable of controlling a plurality of printers whose models are different from one another is updated in the terminal apparatus 10. The terminal apparatus 10 executes a common control program using the common driver to control such printers.

The common control program is software capable of controlling a plurality of apparatuses whose models are different from one another. That is, by updating the common driver in the terminal apparatus 10, a plurality of printers whose models are different from one another can be controlled, and a printer driver for each model need not be updated.

The terminal apparatus 10 obtains, for example, information regarding model names of the printers 2, 3, and 4 connected to the LAN 1 through simple network management protocol (SNMP) communication using management information base (MIB) information. MIB information is information whose format remains the same between apparatuses manufactured by different manufacturers.

That is, the terminal apparatus 10 can obtain the information regarding the model names and the like by receiving MIB information from the multivendor printers connected to the LAN 1.

The server 12 is a cloud server including the common driver. That is, a user of the terminal apparatus 10 can access the server 12 through the Internet 11 and update the common driver in the terminal apparatus 10.

Figure 2:
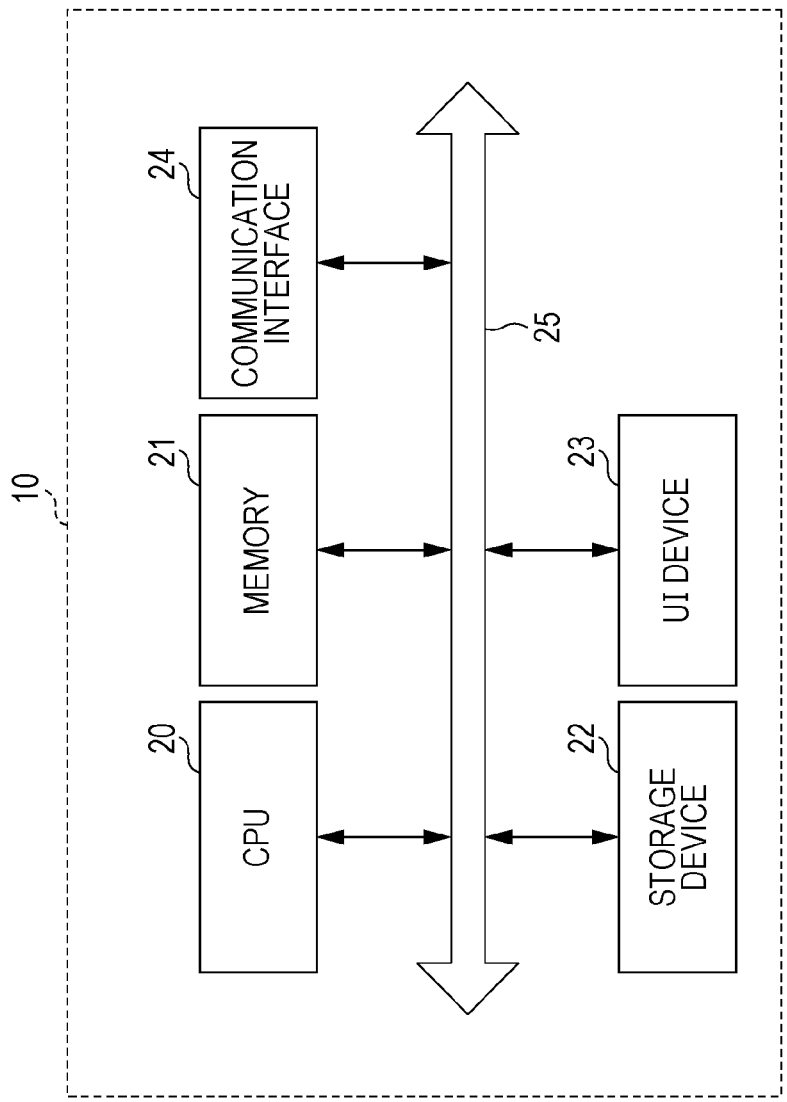
FIG. 2 is a block diagram illustrating the hardware configuration of a terminal apparatus according to the exemplary embodiment of the present disclosure.

FIG. 2 illustrates the hardware configuration of the terminal apparatus 10 in the information processing system according to the present exemplary embodiment.

As illustrated in FIG. 2, the terminal apparatus 10 includes a central processing unit (CPU) 20, a memory 21 capable of temporarily storing data, a storage device 22 such as a hard disk drive (HDD), a user interface (UI) device 23 including a touch panel or a liquid crystal display and a keyboard, and a communication interface 24 that communicates data with external apparatuses through networks such as the LAN 1 and the Internet 11. These components are connected to one another by a control bus 25.

The CPU 20 controls the operation of the terminal apparatus 10 by performing a certain process on the basis of the common control program stored in the memory 21 or the storage device 22. Although the CPU 20 reads and executes the common control program stored in the memory 21 or the storage device 22 in the present exemplary embodiment, the common control program may be stored in a storage medium such as a compact disc read-only memory (CD-ROM) and provided for the CPU 20.

Figure 3:
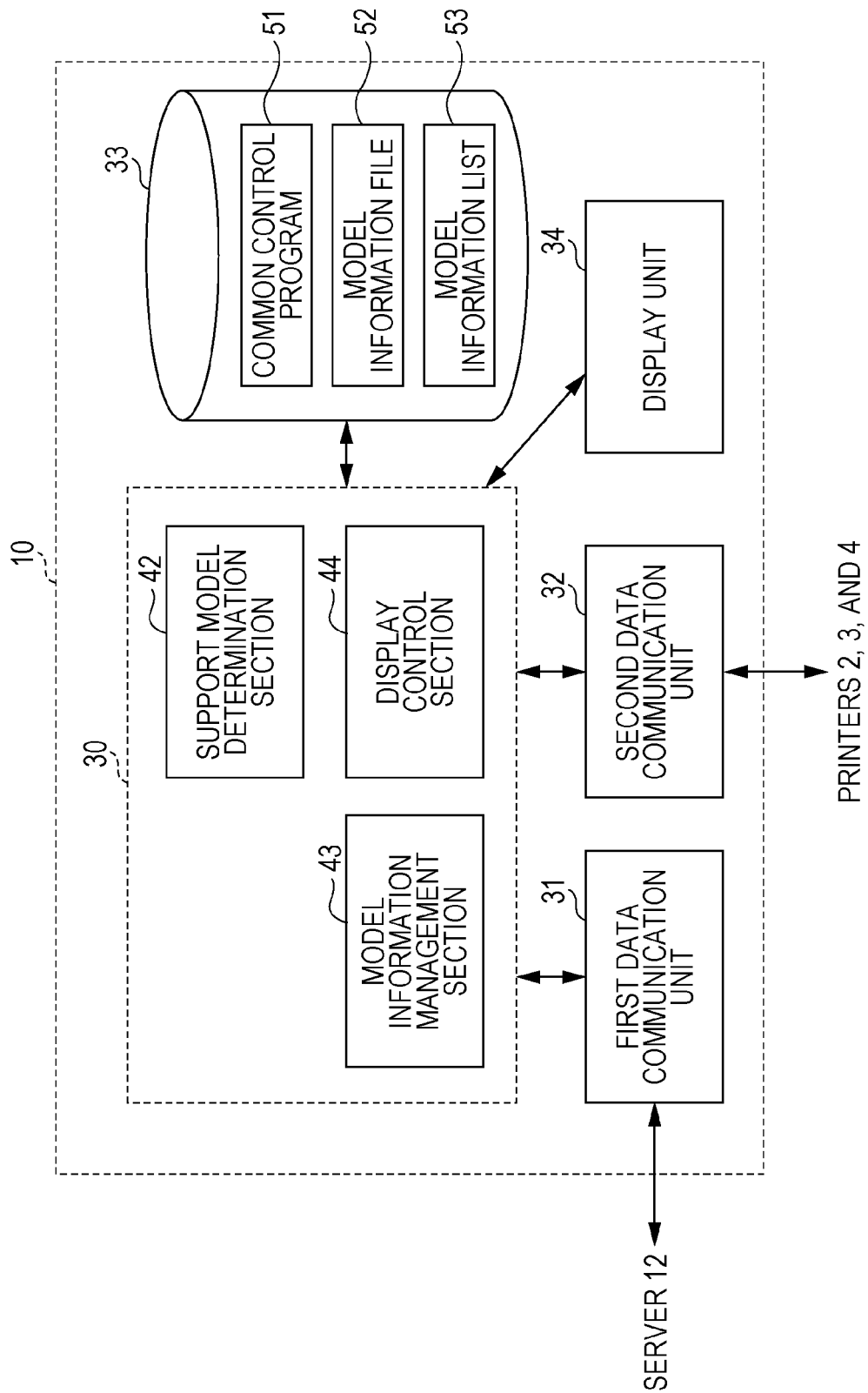
FIG. 3 is a diagram illustrating the functional configuration of the terminal apparatus according to the exemplary embodiment of the present disclosure.

FIG. 3 is a block diagram illustrating the functional configuration of the terminal apparatus 10 achieved by executing the common control program.

As illustrated in FIG. 3, the terminal apparatus 10 according to the present exemplary embodiment includes a control unit 30, a first data communication unit 31, a second data communication unit 32, a storage unit 33, and a display unit 34.

The first data communication unit 31 communicates data with the server 12 through the Internet 11.

The second data communication unit 32 communicates data with the printers 2, 3, and 4 through the LAN 1.

The display unit 34 displays, on a display screen, an operation screen for operating the printers 2, 3, and 4 and the server 12. The display unit 34 receives, on the display screen, operations performed on the printers 2, 3, and 4 and the server 12.

The storage unit 33 stores a common control program 51, a model information file 52, a model information list 53, and the like.

The terminal apparatus 10 functions as a support model determination section 42, a model information management section 43, a display control section 44, and the like by executing the common control program 51 stored in the storage unit 33 using the control unit 30.

The common control program 51 causes the control unit 30 to operate as the support model determination section 42, the model information management section 43, the display control section 44, and the like.

The model information file 52 is obtained from the server 12 as a part of files of the common driver along with update data for the common control program 51 when the common driver is updated.

Figure 4:
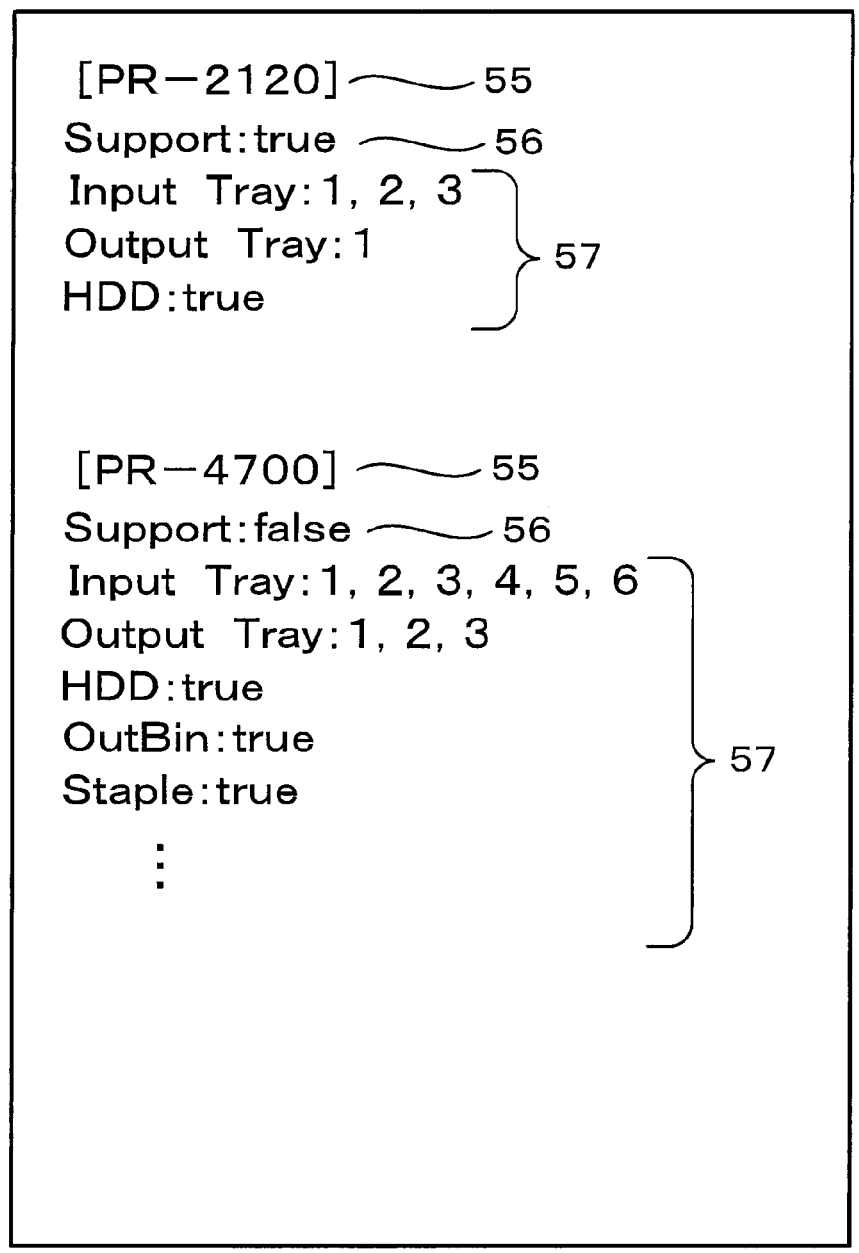
FIG. 4 is a diagram illustrating an example of a model information file stored in a storage unit of the terminal apparatus according to the exemplary embodiment of the present disclosure.

As illustrated in FIG. 4, for example, the model information file 52 includes model information 55 regarding the model names of the plurality of printers 2, 3, and 4, support information 56, which is maintenance information indicating a current maintenance state for each model name, and option information 57 indicating setting items, such as information regarding an input tray for each model name, information regarding an output tray for each model name, information regarding the HDD, information regarding a destination printer, and information regarding a stapling function. The model information file 52 is a read-only file and is not rewritable by the user.

The support information 56 included in the model information file 52 indicates a current maintenance state of each apparatus corresponding to a model name and, more specifically, indicates whether shipping of the apparatus has ended and a maintenance period provided by a corresponding manufacturer has expired. More specifically, for example, the support information 56 indicates "Support: true" for an apparatus whose maintenance period has not expired and "Support: false" for an apparatus whose maintenance period has expired.

The first data communication unit 31 functions as a first obtaining unit that obtains the model information file 52 from the server 12 as well as update data for the common control program 51.

The second data communication unit 32 functions as a second obtaining unit that, when the common control program 51 is updated using update data, obtains information regarding the model names of the connected printers 2, 3, and 4 to be controlled. More specifically, the second data communication unit 32 obtains the information regarding the model names of the printers 2, 3, and 4 by receiving MIB information from the printers 2, 3, and 4.

The support model determination section 42 determines, with reference to the information regarding the model names of the printers 2, 3, and 4 obtained by the second data communication unit 32 and the support information 56 corresponding to the model information 55 included in the model information file 52 obtained by the first data communication unit 31, whether a maintenance period of each of the printers 2, 3, and 4 has expired.

That is, the support model determination section 42 refers to the model information 55 regarding the model names of the printers 2, 3, and 4 and determines whether the support information 56 corresponding to the model information 55 indicates that the maintenance period of each of the printers 2, 3, and 4 has expired.

More specifically, if the support information 56 corresponding to the model information 55 regarding each of the printers 2, 3, and 4 connected to the terminal apparatus 10 indicates "Support: false", the support model determination section 42 determines that the maintenance period of the printer has expired. If the support information 56 corresponding to the model information 55 regarding each of the printers 2, 3, and 4 connected to the terminal apparatus 10 indicates "Support: true", on the other hand, the support model determination section 42 determines that the maintenance period of the printer has not expired.

If the maintenance period of a printer connected to the terminal apparatus 10 has expired, the display control section 44 notifies the user that the maintenance period of the printer has expired and displays a selection screen for asking the user whether to delete a model name of the printer from a model list 61, which will be described later. That is, the display control section 44 displays, on the display unit 34, a message for asking the user whether to delete the model name of the printer from the model list 61.

More specifically, if the support information 56 corresponding to the model information 55 regarding a printer connected to the terminal apparatus 10 indicates "Support: false" in the model information file 52, the display control section 44 notifies the user that the maintenance period of the printer has expired and displays a selection screen for asking the user whether to delete a model name of the printer from the model list 61 as illustrated in FIG. 5.

The model information management section 43 generates the model information list 53 on the basis of selection performed by the user with reference to the model information file 52 and a result of a determination made by the support model determination section 42 and stores the model information list 53 in the storage unit 33.

More specifically, if the user determines, on the selection screen for determining whether to delete a model name of a printer whose maintenance period, according to the support information 56 included in the model information file 52, has expired from the model list 61, that the model name is not to be deleted, the model information management section 43 changes the support information 56 corresponding to the model information 55 included in the model information file 52 from "Support: false" to "Support: true". The model information management section 43 then stores the support information 56 in the storage unit 33 as part of the model information list 53.

The model information list 53 is generated by the model information management section 43. The model information list 53 includes the model information 55, the support information 56, and the option information 57. Although the model information 55 and the option information 57 included in the model information list 53 are the same as those included in the model information file 52, the support information 56 included in the model information list 53 indicates whether to display each model name in the model list 61, that is, whether the user has determined that each model name is to be deleted from the model list 61.

More specifically, the support information 56 included in the model information list 53 is changed to "Support: true" for a printer for which the user has determined that a model name is not to be deleted from the model list 61 even if a maintenance period of the printer has expired. The support information 56 remains as "Support: false", on the other hand, for a printer whose maintenance period has expired and for which the user has determined that a model name is to be deleted from the model list 61.

Figure 6:
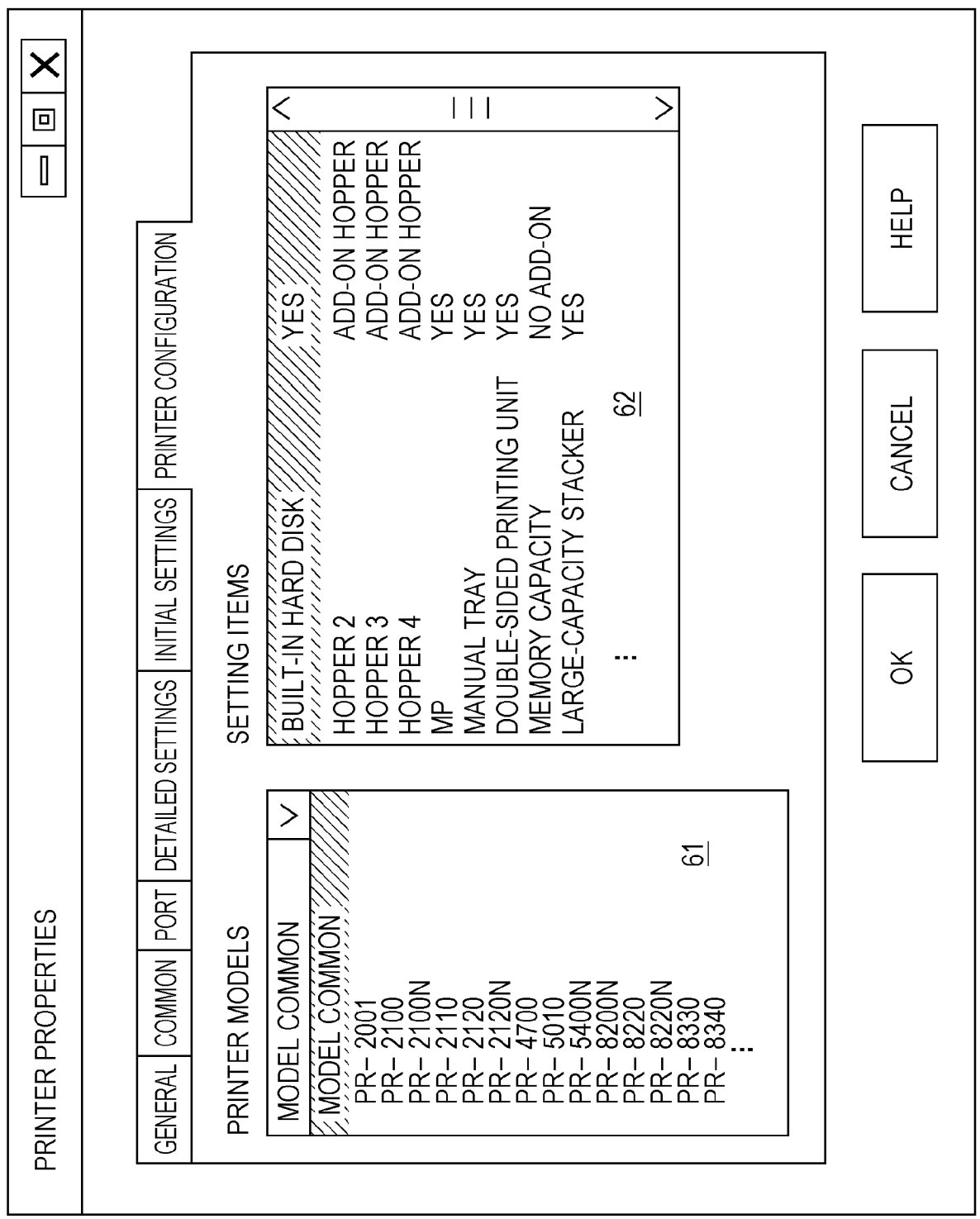
FIG. 6 is a diagram illustrating an example of another display screen of the display unit of the terminal apparatus according to the exemplary embodiment of the present disclosure.
Figure 7A:
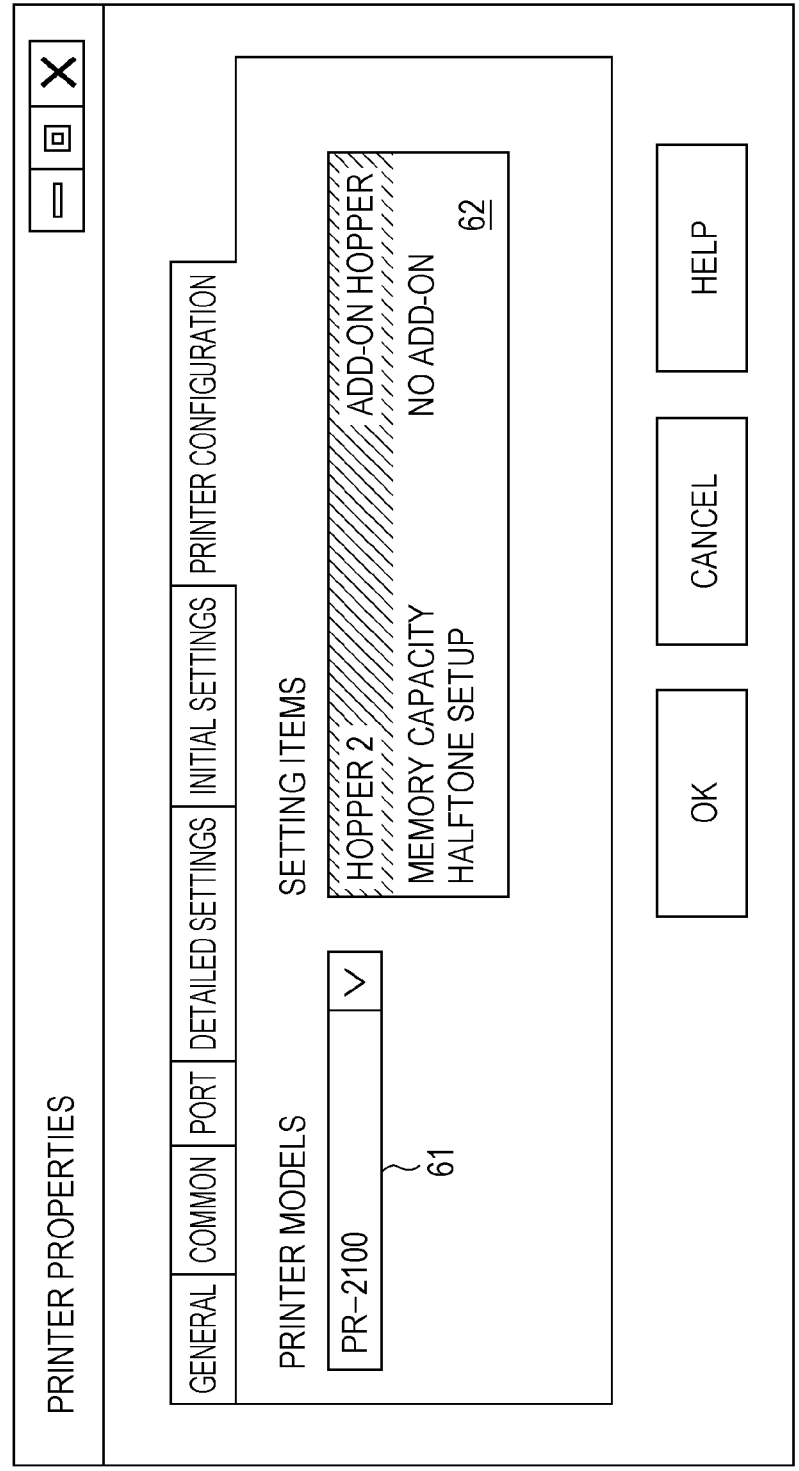
FIGS. 7A and 7B are diagrams illustrating another example of the other display screen of the display unit of the terminal apparatus according to the exemplary embodiment of the present disclosure.
Figure 7B:
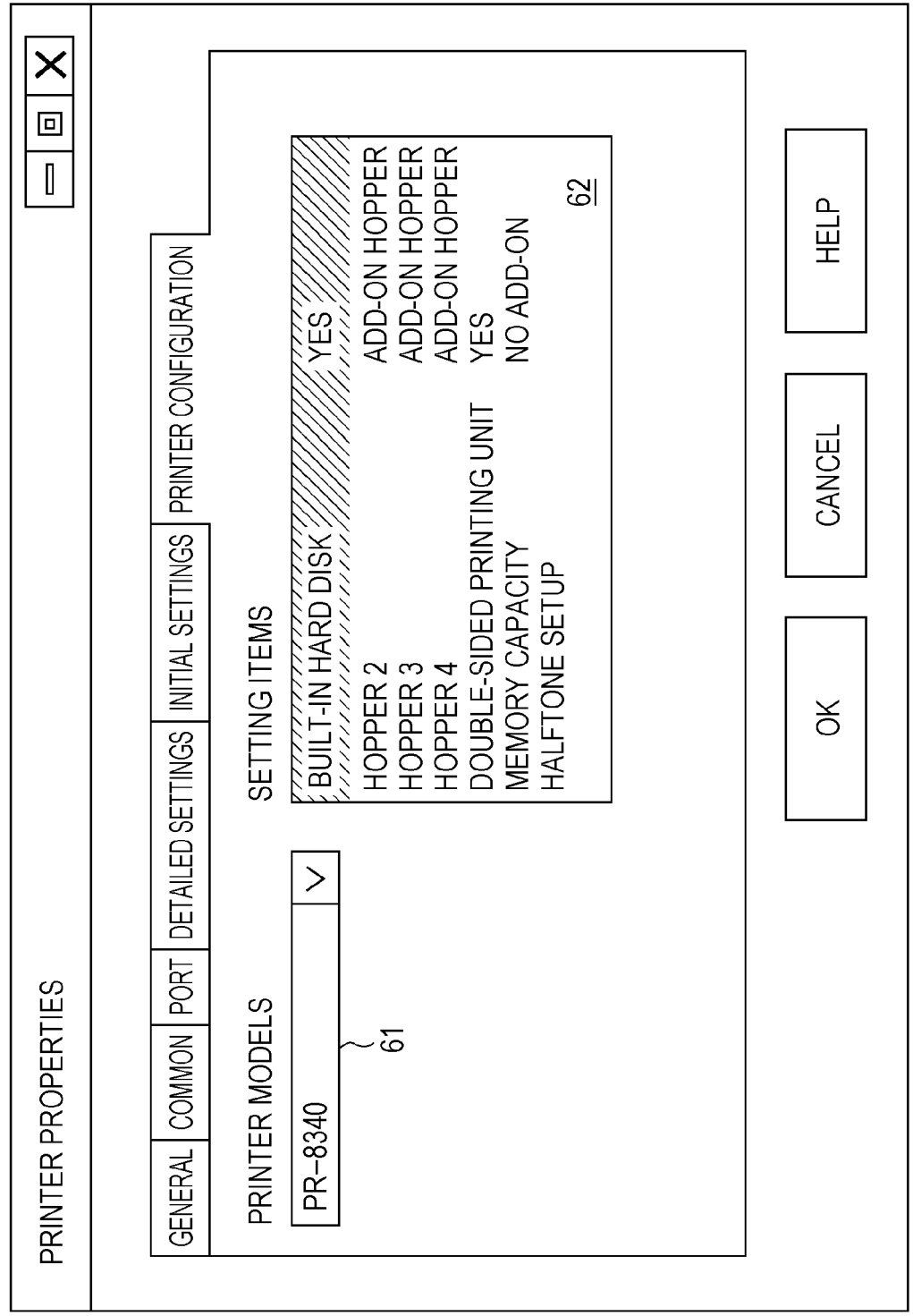

The display control section 44 then refers to the model information list 53 and displays the model list 61 and a setting item list 62, which is set for each model name, on a printer property screen illustrated in FIGS. 6, 7A, and 7B.

That is, the display control section 44 refers to the model information list 53 and, if the user has determined that a model name of a printer whose maintenance period has expired according to the support information 56 is to be deleted from the model list 61, does not display the model name on the model list 61.

The display control section 44 refers to the model information list 53 and, if the user has determined that a model name of a printer whose maintenance period has expired according to the support information 56 is not to be deleted from the model list 61 and the support information 56 has been changed, displays the model name on the model list 61 without deleting the model name.

More specifically, if the support information 56 included in the model information list 53 indicates "Support: true", the display control section 44 displays a corresponding model name on the model list 61. If the support information 56 included in the model information list 53 indicates "Support: false", the display control section 44 does not display a corresponding model name on the model list 61.

Figure 8:
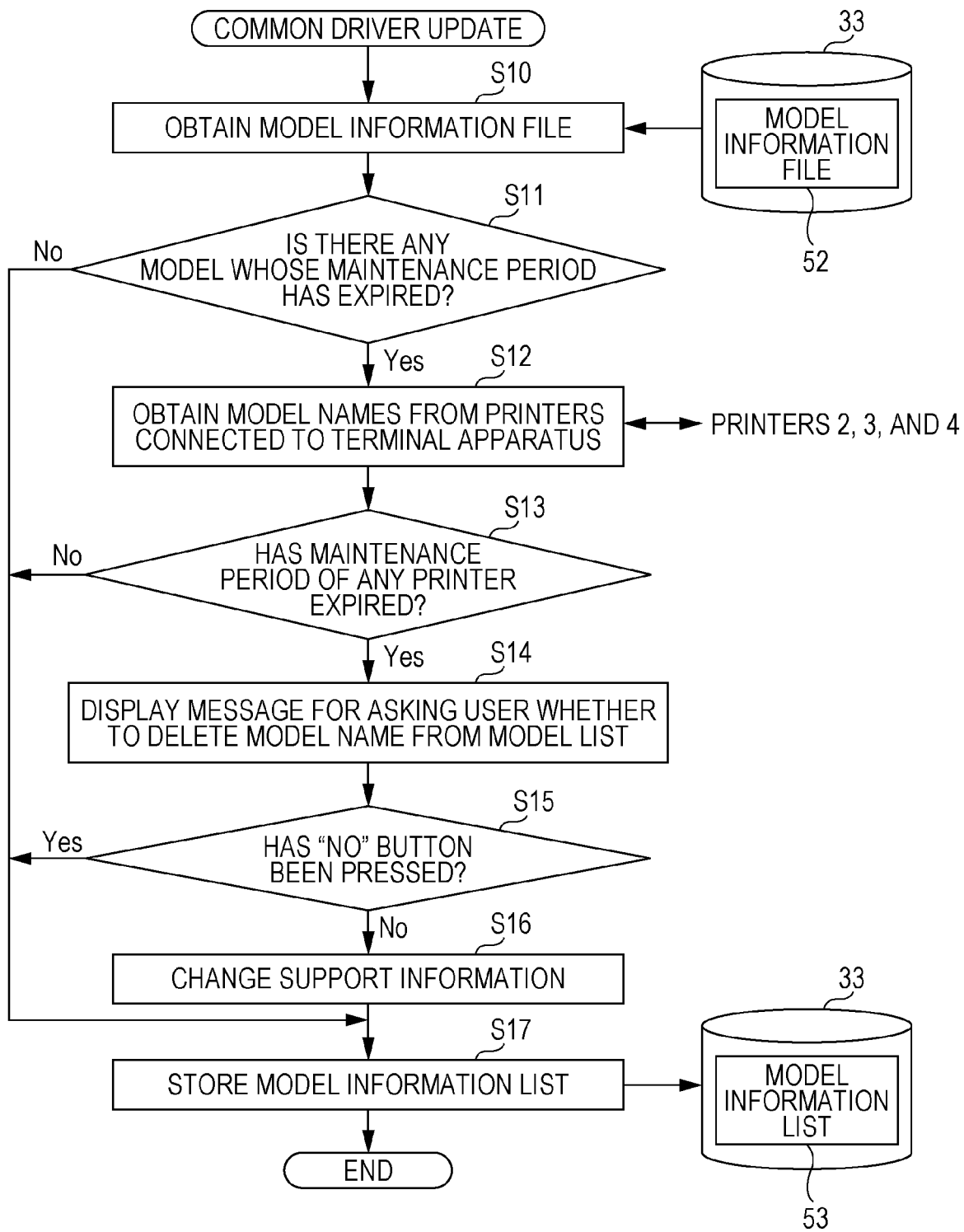
FIG. 8 is a diagram illustrating an example of an operation performed by the terminal apparatus according to the exemplary embodiment of the present disclosure.

Next, an example of an operation performed by the terminal apparatus 10 when the common driver has been updated will be described with reference to FIG. 8.

When the common driver has been updated, the terminal apparatus 10 obtains the model information file 52 from the server 12 using the first data communication unit 31 along with update data regarding the common control program 51 and stores the model information file 52 and the update data in the storage unit 33.

In step S10, the support model determination section 42 obtains the model information file 52 from the storage unit 33.

In step S11, the support model determination section 42 checks the support information 56 included in the model information file 52 and determines whether there is any model whose maintenance period has expired.

If there is any model whose maintenance period has expired, the second data communication unit 32 obtains, in step S12, the information regarding the model names of the printers 2, 3, and 4 by receiving MIB information from the printers 2, 3, and 4 through SNMP communication.

In step S13, the support model determination section 42 refers to the model information 55 regarding the model names of the printers 2, 3, and 4 and determines whether any piece of the support information 56 corresponding to the model information 55 regarding the model names indicates that a maintenance period of a printer has expired. More specifically, the support model determination section 42 determines whether any piece of the support information 56 corresponding to the model information 55 regarding the printers 2, 3, and 4 connected to the terminal apparatus 10 indicates "Support: false" in the model information file 52.

If a maintenance period of any of the printers 2, 3, and 4 connected to the terminal apparatus 10 has expired, the display control section 44 displays, in step S14, a message indicating that the maintenance period of the printer having the model name has expired and also displays a selection screen for asking the user whether to delete the model name from the model list 61 on the property screen as illustrated in FIG. 5. That is, the display control section 44 displays, on the display unit 34, a message for asking the user whether to delete, from the model list 61, the model name of the printer whose maintenance period has expired.

In step S15, the model information management section 43 determines whether a "NO" button has been pressed on the selection screen, such as that illustrated in FIG. 5, for the printer whose maintenance period has expired.

If the "NO" button has been pressed, the model information management section 43 determines, in step S16, that the model name of the printer whose maintenance period has expired is not to be deleted from the model list 61. The model information management section 43 then changes the support information 56 included in the model information file 52 from "Support: false" to "Support: true".

In step S17, the model information management section 43 generates the model information list 53 and stores the model information list 53 in the storage unit 33.

Next, an example of a display screen after the common driver is activated to execute the common control program 51 will be described in detail with reference to FIGS. 6, 7A, and 7B.

After the common control program 51 is executed, the model list 61 for selecting a model name to be used in the common driver and the setting item list 62 that displays items settable for each model name are displayed on the property screen. The user may select one of two model modes, namely model common mode and a model selection mode, on the model list 61.

In the model common mode, the same setting items are set for all models. In the model selection mode, a model name to be used is selected and setting items are set for the model name.

As illustrated in FIG. 6, if "model common" is selected on the model list 61, for example, the model common mode is established. Common setting items are then displayed on the setting item list 62 for different models.

If a model name is selected on the model list 61, on the other hand, the model selection mode is established. Setting items corresponding to the selected model name are then displayed on the setting item list 62 as illustrated in FIGS. 7A and 7B.

Models names and setting items for each of the model names controllable by the common driver are displayed on the model list 61 and the setting item list 62, respectively, on the basis of the model information list 53 stored in the storage unit 33.

Figure 9:
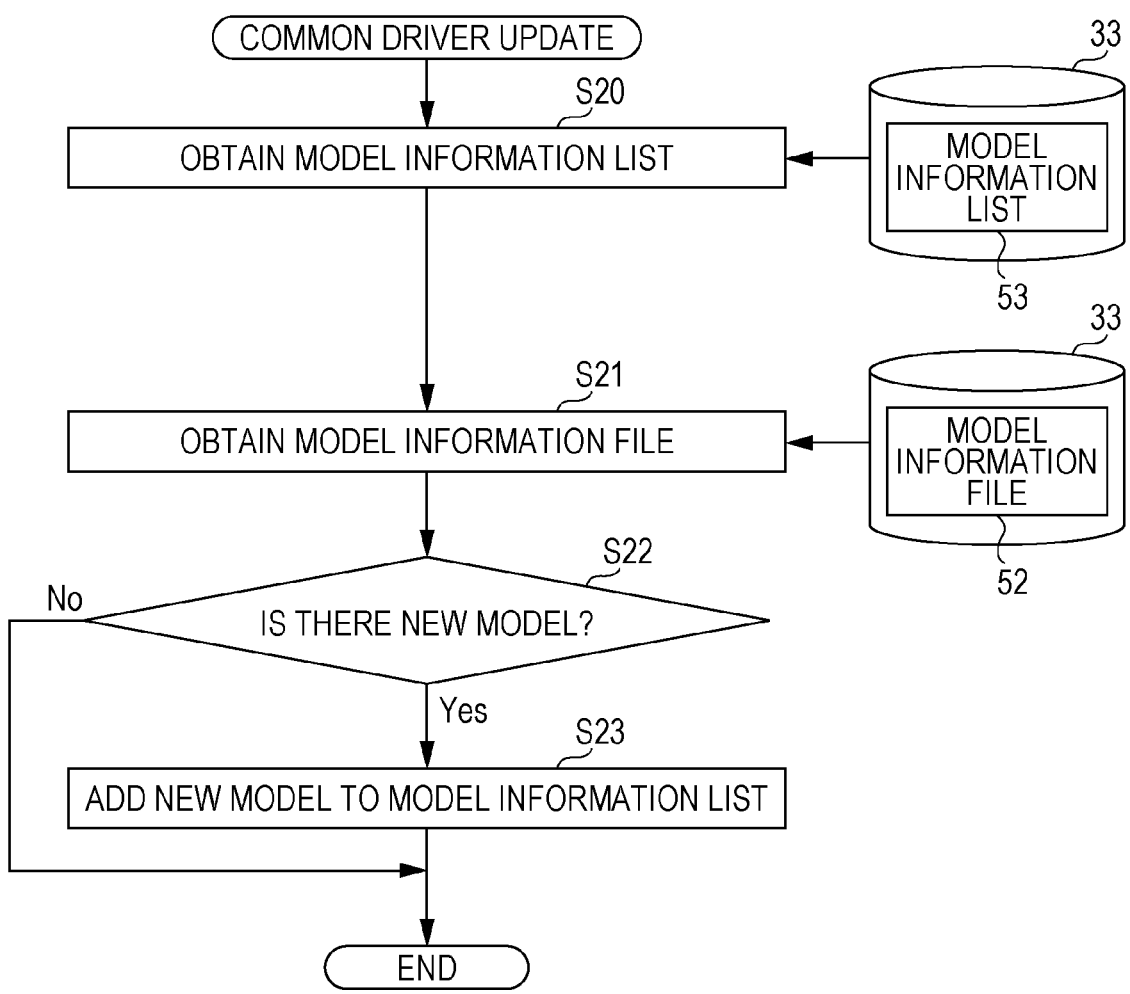
FIG. 9 is a diagram illustrating an example of another operation performed by the terminal apparatus according to the exemplary embodiment of the present disclosure.

Next, an example of an operation performed by the terminal apparatus 10 when the common driver and data have been updated will be described with reference to FIG. 9.

When the common driver has been updated, the terminal apparatus 10 obtains the latest model information file 52 from the server 12 using the first data communication unit 31 along with latest update data regarding the common control program 51 and stores the model information file 52 and the update data in the storage unit 33.

In step S20, the support model determination section 42 obtains the model information list 53 from the storage unit 33.

In step S21, the support model determination section 42 obtains the latest model information file 52 from the storage unit 33.

In step S22, the support model determination section 42 determines whether the latest model information file 52 includes a new model that is not included in the model information list 53.

If the latest model information file 52 includes a new model that is not included in the model information list 53, the support model determination section 42 adds, in step S23, information regarding the new model to the model information list 53.

The model information list 53 to which the information regarding the new model has been added is determined as the model information file 52 and the same operation as steps S11 to S17 described above is performed.

If it is determined in step S22 that the latest model information file 52 does not include a new model, the model information list 53 obtained in step S20 is determined as the model information file 52 and the same operation as steps S11 to S17 described above is performed.

Although the printers 2, 3, and 4 are used as an example of a plurality of apparatuses whose models are different from one another in the present exemplary embodiment, the present disclosure is not limited to this. The present disclosure may also be applied when other electronic devices are controlled using a common driver.

Although the terminal apparatus 10 is used as an example of an information processing apparatus in the present exemplary embodiment, the present disclosure is not limited to this. The present disclosure may also be applied when another information processing apparatus is used.

Figure 10:
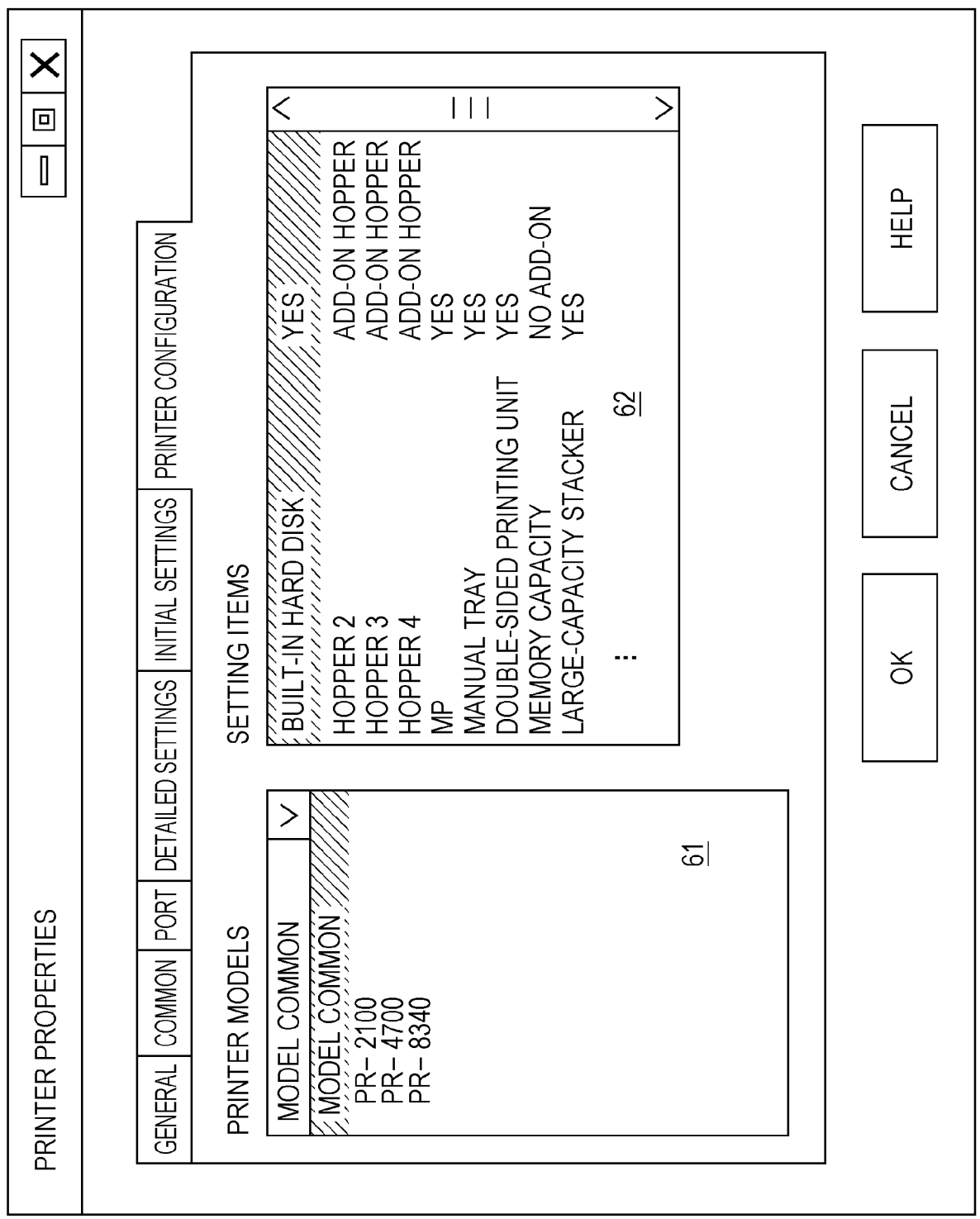
FIG. 10 is a diagram illustrating another example of the other display screen of the display unit of the terminal apparatus according to the exemplary embodiment of the present disclosure.

Although the display control section 44 displays, on the model list 61, all model names whose support information 56 included in the model information list 53 indicates "Support: true" as well as "model common" in the present exemplary embodiment, the present disclosure is not limited to this. As illustrated in FIG. 10, for example, the display control section 44 may display only model names obtained by receiving MIB information corresponding to support information 56 included in the model information list 53 indicating "Support: true" as well as "model common", instead. That is, the display control section 44 may display only model names of apparatuses connected to the terminal apparatus 10.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a first hardware communication interface that obtains update data for a common control program capable of controlling a plurality of apparatuses whose models are different from one another and a model information file including maintenance information indicating a current maintenance state of each of the plurality of apparatuses;
a second hardware communication interface that, when updating the common control program using the update data obtained by the first hardware communication interface, obtains information regarding a model name from a connected apparatus to be controlled; and
a hardware controller that, if the maintenance information regarding the connected apparatus from which the second hardware communication interface has obtained the information regarding the model name indicates that a maintenance period has expired, displays a selection screen for asking a user whether to delete the model name from a model list displayed to the user by the common control program.

2. The information processing apparatus according to claim 1,
wherein the second hardware communication interface obtains the information regarding the model name of the connected apparatus to be controlled using management information base information received from the connected apparatus.

3. The information processing apparatus according to claim 2,
wherein, if the user determines that the model name is to be deleted from the model list displayed to the user by the common control program, the hardware controller does not display the model name on the model list.

4. The information processing apparatus according to claim 3, further comprising:
a non-transitory storage medium that stores the information regarding the model name of the connected apparatus to be deleted from the model list,
wherein, if the second obtaining information obtains the information regarding the model name stored in the non-transitory storage medium, the hardware controller does not display the model name on the model list.

5. The information processing apparatus according to claim 2,
wherein, if the user determines that the model name is not to be deleted from the model list displayed to the user by the common control program, the hardware controller displays the model name on the model list.

6. The information processing apparatus according to claim 5, further comprising:
a non-transitory storage medium that stores the information regarding the model name of the connected apparatus not to be deleted from the model list,
wherein, if the second obtaining information obtains the information regarding the model name stored in the non-transitory storage medium, the hardware controller displays the model name on the model list even when the maintenance information regarding the connected apparatus indicates that the maintenance period has expired.

7. The information processing apparatus according to claim 1,
wherein, if the user determines that the model name is to be deleted from the model list displayed to the user by the common control program, the hardware controller does not display the model name on the model list.

8. The information processing apparatus according to claim 7, further comprising:
a non-transitory storage medium that stores the information regarding the model name of the connected apparatus to be deleted from the model list,
wherein, if the second obtaining information obtains the information regarding the model name stored in the non-transitory storage medium, the hardware controller does not display the model name on the model list.

9. The information processing apparatus according to claim 1,
wherein, if the user determines that the model name is not to be deleted from the model list displayed to the user by the common control program, the hardware controller displays the model name on the model list.

10. The information processing apparatus according to claim 9, further comprising:
a non-transitory storage medium that stores the information regarding the model name of the connected apparatus not to be deleted from the model list,
wherein, if the second obtaining information obtains the information regarding the model name stored in the non-transitory storage medium, the hardware controller displays the model name on the model list even when the maintenance information regarding the connected apparatus indicates that the maintenance period has expired.

11. The information processing apparatus according to claim 1,
wherein the hardware controller is configured to determine whether the model information file includes a new model that is not included in a model list, if the model information file includes the new model that is not included in the model list, the hardware controller adds information regarding the new model to the model list.

12. A non-transitory computer readable medium storing a program causing a computer to execute a process comprising:
obtaining update data for a common control program capable of controlling a plurality of apparatuses whose models are different from one another and a model information file including maintenance information indicating a current maintenance state of each of the plurality of apparatuses;
obtaining, when updating the common control program using the update data obtained in the obtaining the update data, information regarding a model name from a connected apparatus to be controlled; and asking, if the maintenance information regarding the connected apparatus from which the information regarding the model name has been obtained in the obtaining the information indicates that a maintenance period has expired, a user whether to delete the model name from a model list displayed to the user by the common control program.

13. An information processing method comprising:

obtaining update data for a common control program capable of controlling a plurality of apparatuses whose models are different from one another and a model information file including maintenance information indicating a current maintenance state of each of the plurality of apparatuses;

obtaining, when updating the common control program using the update data obtained by the obtaining means, obtaining information regarding a model name from a connected apparatus to be controlled; and controlling, if the maintenance information regarding the connected apparatus from which the obtaining means has obtained the information regarding the model name indicates that a maintenance period has expired, displaying a selection screen for asking a user whether to delete the model name from a model list displayed to the user by the common control program.

* * * * *